US007929968B2

United States Patent
Joshi et al.

(10) Patent No.: US 7,929,968 B2
(45) Date of Patent: Apr. 19, 2011

(54) SYSTEM AND METHOD TO FACILITATE INTER-FREQUENCY HANDOFF OF MOBILE TERMINALS IN A WIRELESS COMMUNICATION NETWORK

(75) Inventors: Avinash Joshi, Orlando, FL (US); Shyamai Ramachandran, Maitland, FL (US)

(73) Assignee: MeshNetworks, Inc., Maitland, FL (US)

( * ) Notice: Subject to any disclaimer, the term of this patent is extended or adjusted under 35 U.S.C. 154(b) by 841 days.

(21) Appl. No.: 11/251,674

(22) Filed: Oct. 17, 2005

(65) Prior Publication Data
US 2006/0084439 A1 Apr. 20, 2006

Related U.S. Application Data

(60) Provisional application No. 60/619,464, filed on Oct. 15, 2004.

(51) Int. Cl.
*H04W 36/00* (2009.01)
*H04W 4/00* (2009.01)
(52) U.S. Cl. .................... 455/437; 455/440; 370/331
(58) Field of Classification Search .............. 455/436, 455/437, 438, 440
See application file for complete search history.

(56) References Cited

U.S. PATENT DOCUMENTS

| | | | |
|---|---|---|---|
| 5,649,000 A | 7/1997 | Lee et al. | |
| 6,081,714 A | 6/2000 | Wakizaka | |
| 6,208,631 B1 | 3/2001 | Kim | |
| 6,360,264 B1 | 3/2002 | Rom | |
| 6,542,744 B1 * | 4/2003 | Lin | 455/437 |
| 6,563,807 B1 | 5/2003 | Kim et al. | |
| 6,725,044 B2 | 4/2004 | Verma et al. | |
| 6,785,510 B2 * | 8/2004 | Larsen | 455/11.1 |
| 6,807,165 B2 | 10/2004 | Belcea | |
| 6,873,839 B2 | 3/2005 | Stanforth | |

(Continued)

FOREIGN PATENT DOCUMENTS

KR  10-2002-0060391 A  7/2002

OTHER PUBLICATIONS

Urasawa, F, et al., "Analysis and Simulation Results of Multihop Handoff Scheme in an Ad Hoc Wireless Network," The 5th International Symposium on Wireless Personal Multimedia Communications, 2002, IEEE vol. 3 , Oct. 27-30, 2002, pp. 1366-1369.

(Continued)

*Primary Examiner* — Patrick N Edouard
*Assistant Examiner* — Michael T Thier
(74) *Attorney, Agent, or Firm* — Randi L. Karpinia; Joseph Buczynski

(57) ABSTRACT

A system and method for facilitating inter-frequency handoff of a mobile node (102) in a wireless communication network (100). The system and method permit a mobile node (102), equipped with a single receiver, to perform handoffs seamlessly from one infrastructure node (106-1) to another infrastructure node (106-2) without having to scan through multiple frequencies and without having to interrupt the active communication session.

9 Claims, 6 Drawing Sheets

U.S. PATENT DOCUMENTS

| | | | |
|---|---|---|---|
| 7,072,650 | B2 | 7/2006 | Stanforth |
| 7,123,910 | B2 * | 10/2006 | Lucidarme et al. ............ 455/434 |
| 2002/0082019 | A1 | 6/2002 | Sunay et al. |
| 2002/0132621 | A1 * | 9/2002 | Takano et al. ................. 455/435 |
| 2004/0053614 | A1 * | 3/2004 | Il-Gyu et al. ................... 455/436 |
| 2004/0143842 | A1 | 7/2004 | Joshi |
| 2004/0235439 | A1 * | 11/2004 | Husted et al. ................. 455/136 |
| 2004/0246935 | A1 | 12/2004 | Joshi et al. |
| 2004/0264504 | A1 * | 12/2004 | Jin ................................ 370/469 |
| 2005/0130659 | A1 * | 6/2005 | Grech et al. ................... 455/436 |
| 2006/0035639 | A1 * | 2/2006 | Etemad et al. ................ 455/436 |

OTHER PUBLICATIONS

Ming He et al., "Ad Hoc Assisted Handoff for Real-time Voice in IEEE 802.11 Infrastructure WLANs," IEEE Communications Society, WCNC 2004, IEEE, pp. 201-206.

PCT/US05/37034, International Search Report, mailed Apr. 25, 2006, 1 page.

Korean Patent Office, Korean Application No. 10-2007-7010925, Office Action [translated], Report on Preliminary Rejection, email dated Aug. 5, 2008, 3 pages.

* cited by examiner

SYSTEM AND METHOD TO FACILITATE INTER-FREQUENCY HANDOFF OF MOBILE TERMINALS IN A WIRELESS COMMUNICATION NETWORK

This application claims the benefit of U.S. Provisional Application No. 60/619,464, filed Oct. 15, 2004, the entire content being incorporated herein by reference.

FIELD OF THE INVENTION

The present invention relates to wireless communication networks and, more particularly, to a system and method for facilitating inter-frequency handoff of mobile terminals in a wireless communication network.

BACKGROUND

Mobile wireless systems rely on efficient handoff algorithms in order to enable subscriber mobility while guaranteeing uninterrupted connectivity and required quality of service (QoS). Based on the frequency channels involved in the handoff process, handoff algorithms can be broadly classified as inter-frequency handoffs and same-frequency handoffs. Inter-frequency handoffs result in the mobile station resuming the current communication session on a different frequency at the end of the handoff process. Same-frequency handoffs result in the mobile station resuming the current communication session over the same frequency subsequent to the completion of the handoff process. In other words, in inter-frequency handoffs, the mobile station re-establishes connection via a different infrastructure node that operates on a frequency different from the one used by the mobile station before the handoff. In same-frequency handoffs, the mobile station re-establishes connection via a different infrastructure node that operates on a frequency exactly the same as the one used by the mobile station before the handoff.

Handoff algorithms are in widespread use in cellular systems. Early second generation (2 G) systems such as a Global System for Mobile Communication (GSM), implement inter-frequency handoffs in which different base stations transmit different frequencies on the downlink, and the mobile station measures the received signal quality of the active base station and up to six other neighboring base stations and reports the measurements to the active base station periodically. The mobile station performs these measurements by tuning its frequency to that of neighboring base stations during pre-defined time intervals when it does not exchange user data. The active base station forwards the measurements to a higher network entity, such as the base station controller. The base station controller determines from the measurements whether a handoff is necessary. If a handoff is deemed necessary, the base station controller selects the most suited base station from the list of measured base stations. The base station controller then informs the mobile station about the selected base station and its transmission parameters through the active base station, and directs the mobile station to handoff to the selected base station.

Cellular Digital Packet Data (CDPD) systems also perform inter-frequency handoffs by initiating channel scanning when the active channel is perceived to be unacceptable. Standards based on the code division multiple access (CDMA) technology, such as Interim Standard (IS)-95 and the more recent CDMA 2000-based and Universal Mobile Telecommunications Systems (UMTS)-based third generation (3 G) variants perform same-frequency handoffs. Both the International Institute of Electrical and Electronics Engineers (IEEE) Standard 802.11 and the High Performance Radio Local Area Network (HIPERLAN) 2 Standard support inter-frequency handoffs. They require the mobile stations to interrupt active communication sessions and scan alternate channels for possible beacon frames from other access points.

There has recently been considerable interest in the field of inter-system handoff and vertical handoff algorithms. Many fourth generation (4 G) networks propose seamless handoff between dissimilar systems like cellular and wireless local area networks (WLAN). In such systems the mobile stations are required to have the capability to transmit and receive the signals of the multiple systems involved. In most cases, mobile stations are required to have separate receivers for each communication system.

Some communication systems use a separate dedicated channel on which all base stations advertise their presence. A mobile station that requires performing a handoff need not scan the whole frequency band to identify suitable handoff candidates. Instead a mobile station only scans this single channel used for advertisements, to scan for suitable handoff candidates. Although this process is less time consuming compared to scanning multiple channels, the process does tend to waste bandwidth resources, especially if handoffs are not very frequent.

All forms of inter-frequency handoff algorithms discussed above require the mobile station to interrupt the active communication session to scan one or more other frequencies to listen for other infrastructure nodes that might be targeted for handoff. Therefore, such systems waste significant amounts of transmission time scanning for handoff candidates when actual user data could be transmitted. Such systems also risk losing significant amounts of information on the active communication channel, while their receiver is busy scanning other frequencies to assess potential handoff candidates. In order to avoid having to interrupt the active communication session, certain handoff algorithms require the use of one or more secondary receivers to perform simultaneous measurements on frequencies other than the active frequency. Such systems utilize the extra receiver or receivers to scan all channels or the dedicated handoff channel continuously, which eliminates the need for the primary receiver to go off-channel for scanning and thereby eliminates the risk of data loss. However, equipping mobile nodes with multiple receivers increases their cost as well as complexity.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
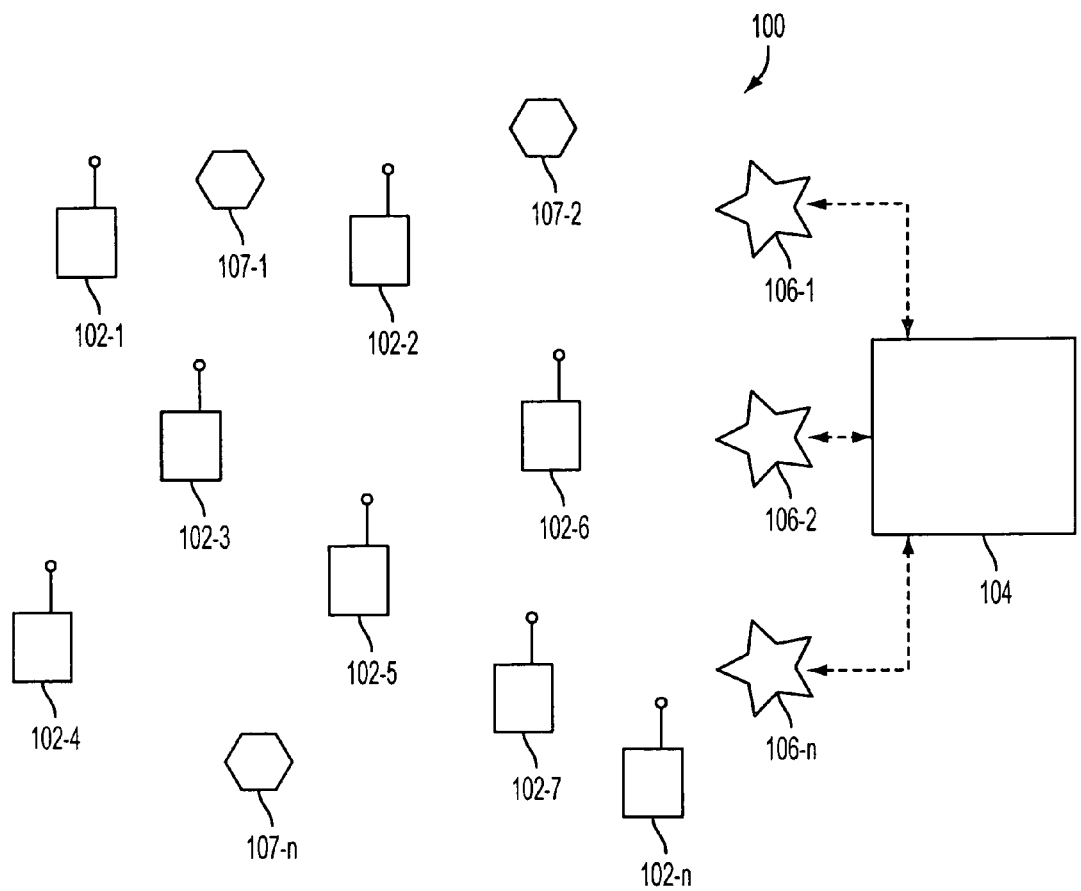
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for facilitating inter-frequency handoff of mobile terminals in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for facilitating inter-frequency handoff of mobile terminals in a wireless communication network as described herein. The non-processor circuits may include, but are not limited to, a radio receiver, a radio transmitter, signal drivers, clock circuits, power source circuits, and user input devices. As such, these functions may be interpreted as steps of a method for facilitating inter-frequency handoff of mobile terminals in a wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for facilitating inter-frequency handoff of mobile terminals in a wireless communication network, such that a mobile terminal is not required to spend time scanning other channels to determine a candidate for handoff. Furthermore, in accordance with the present invention, it is not necessary for each mobile terminal to have more than one receiver to achieve the inter-frequency handoff. Hence, the system and method permits a mobile terminal, equipped with a single receiver, to perform handoffs from one infrastructure node in the wireless communication network to another, either directly or over multiple hops, without having to scan through multiple frequencies and without having to interrupt an active communication session. The system and method according to the present invention therefore reduce packet loss during handoff and improve the speed at which handoff can occur.

As can be appreciated by one skilled in the art, handoff algorithms attempt to seamlessly disconnect old connections and establish new connections between mobile subscribers and the fixed infrastructure network. These algorithms are expected to possess the following desirable attributes.

Low handoff latency—the time required to sever old links and recreate new links should be minimal. The communication session between the mobile subscriber and the infrastructure network should be interrupted as briefly as possible.

Minimal quality of service (QoS) degradation and minimum data loss. If the session must be interrupted, the loss in user experience or in physical data itself should be minimal.

Minimal additional signaling—the handoff process should involve minimal signaling overhead.

Minimal additional hardware—the handoff process should require little or no additional hardware in both the mobile terminal as well as the fixed network infrastructure.

As can further be appreciated by one skilled in the art, in recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of intelligent access points 106-1, 106-2, . . . 106-n (referred to generally as nodes 106, access points 106, or intelligent access points (IAPs) 106), for providing nodes 102 with access to the fixed network 104. The fixed network 104 can include, for example, a core local access network (LAN) or a wide area network (WAN) backbone, and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 6,807,165, 6,873,839, and 7,072,650, each being incorporated herein by reference.

Figure 2:
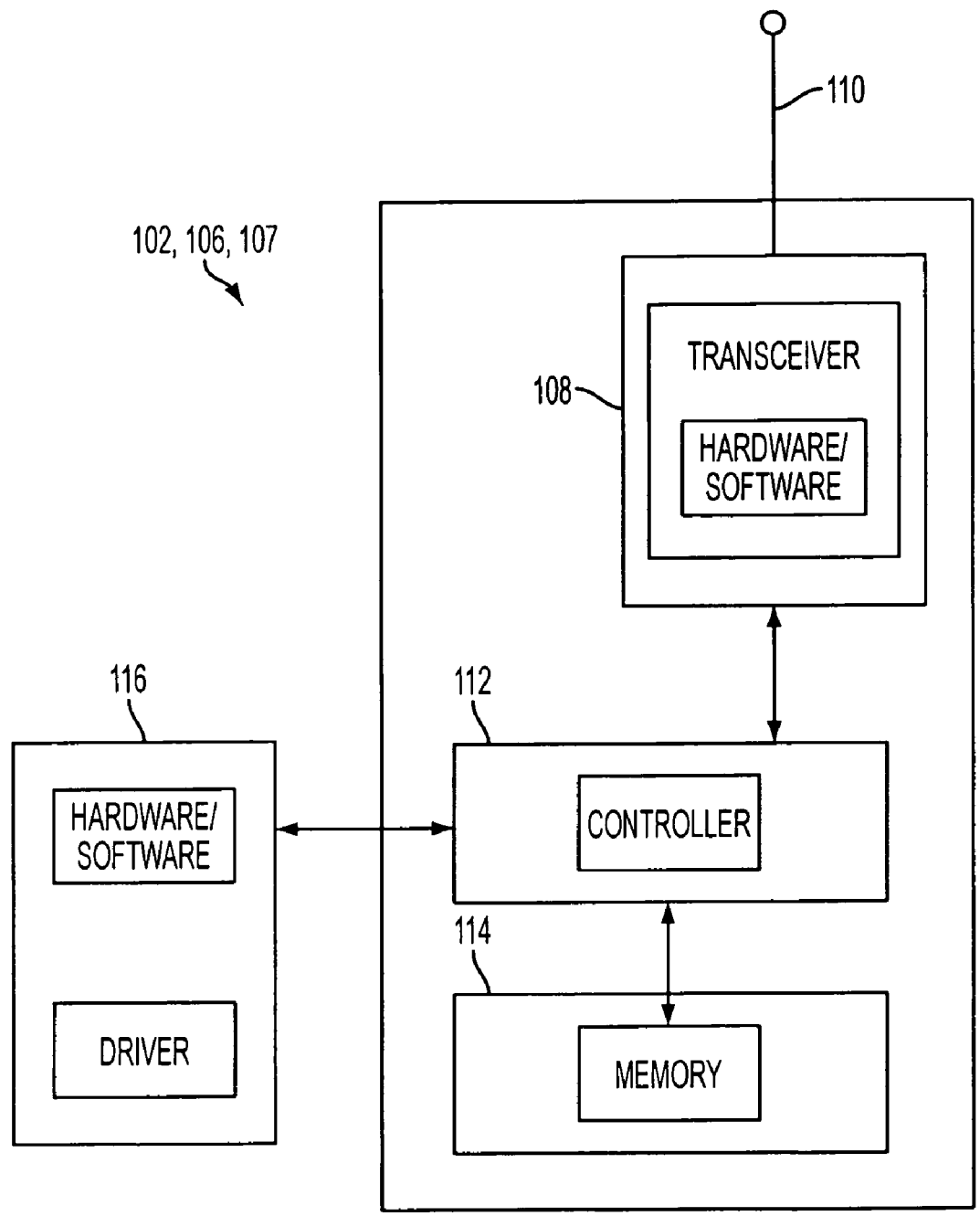
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
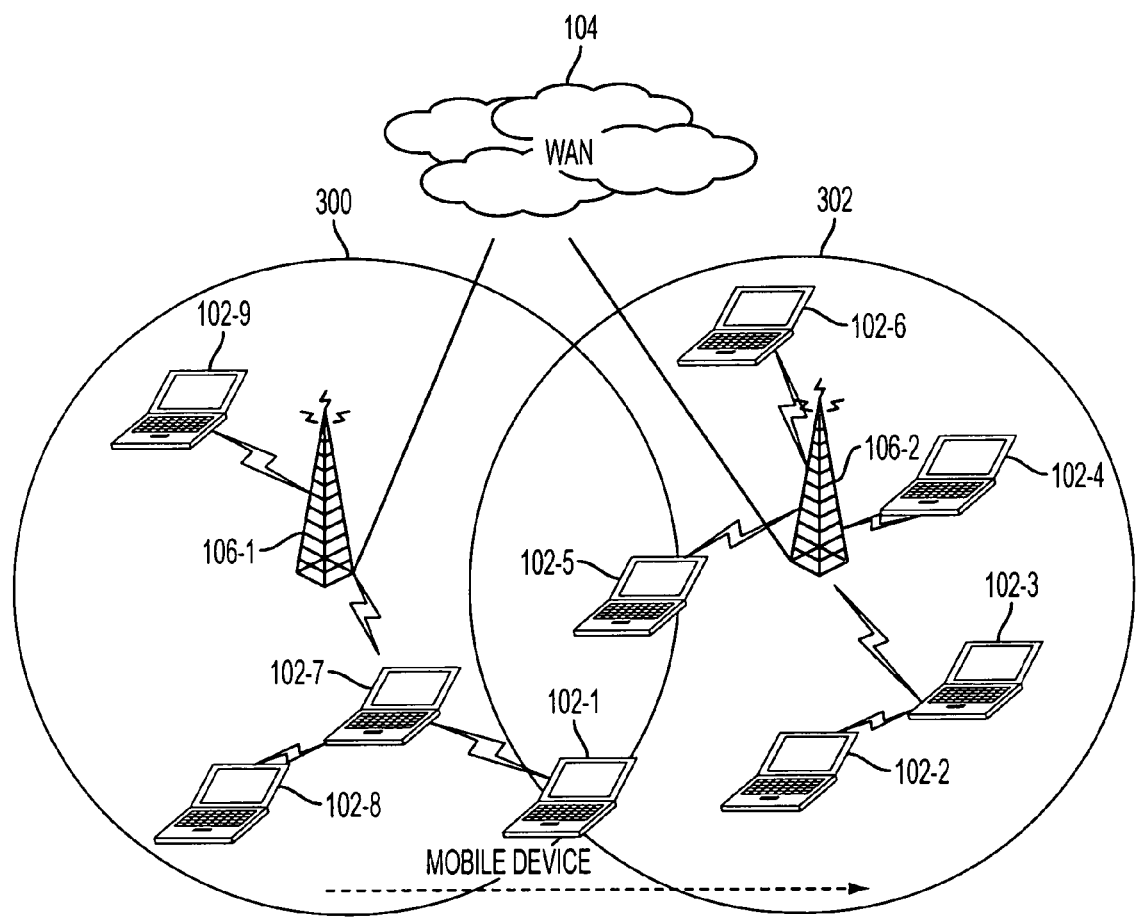
FIG. 3 is a conceptual block diagram illustrating an example of a mobile node of the network shown in FIG. 1 moving from one coverage area to another.

FIG. 3 shows an example of the network 100 in which a mobile device (mobile node 102-1) is shown moving from the coverage area 300 of one IAP 106-1 into the coverage area 302 of another IAP 106-2. In this example, the mobile node 102-1 is initially associated with IAP 106-1 either directly or a multihop route through other nodes, such as other mobile nodes 102 or fixed routers 107. It is assumed for purposes of this example that the IAPs 106-1 and 106-2 operate on different frequencies to maximize the spectral utilization. Hence, in this example IAP 106-1 does not communicate with IAP 106-2 directly over the wireless air interface. It is also assumed for purposes of this example that all IAPs 106 in the network 100 know about the other IAPs 106 which are deployed around them, and also know about the frequency in which these other IAPs 106 are operating. This can either be preconfigured or can be distributed by a central network controller or network management system, or can be determined dynamically by suitable methods as can be appreciated by one skilled in the art.

Figure 4A:
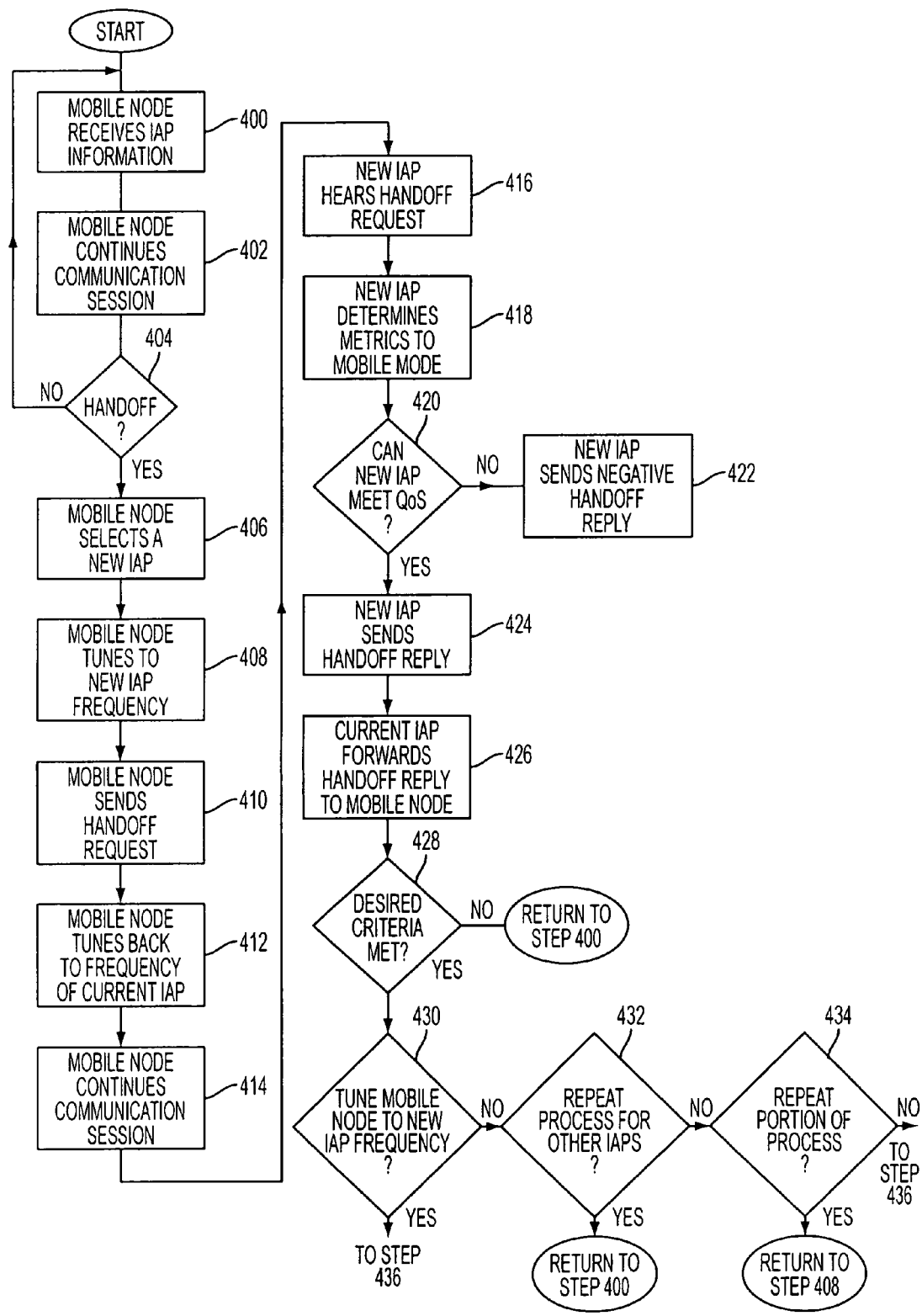
FIG. 4 is a flowchart illustrating an example of operations performed by the mobile node undergoing the handoff process according to an embodiment of the present invention.
Figure 4B:
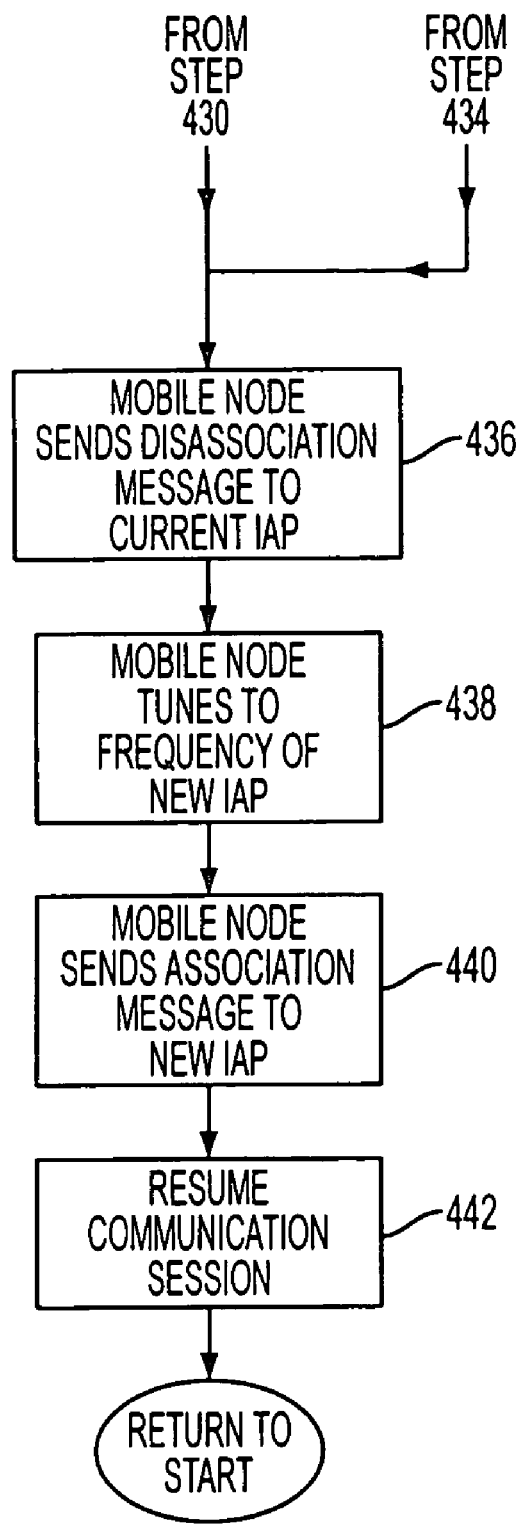
Figure 5:
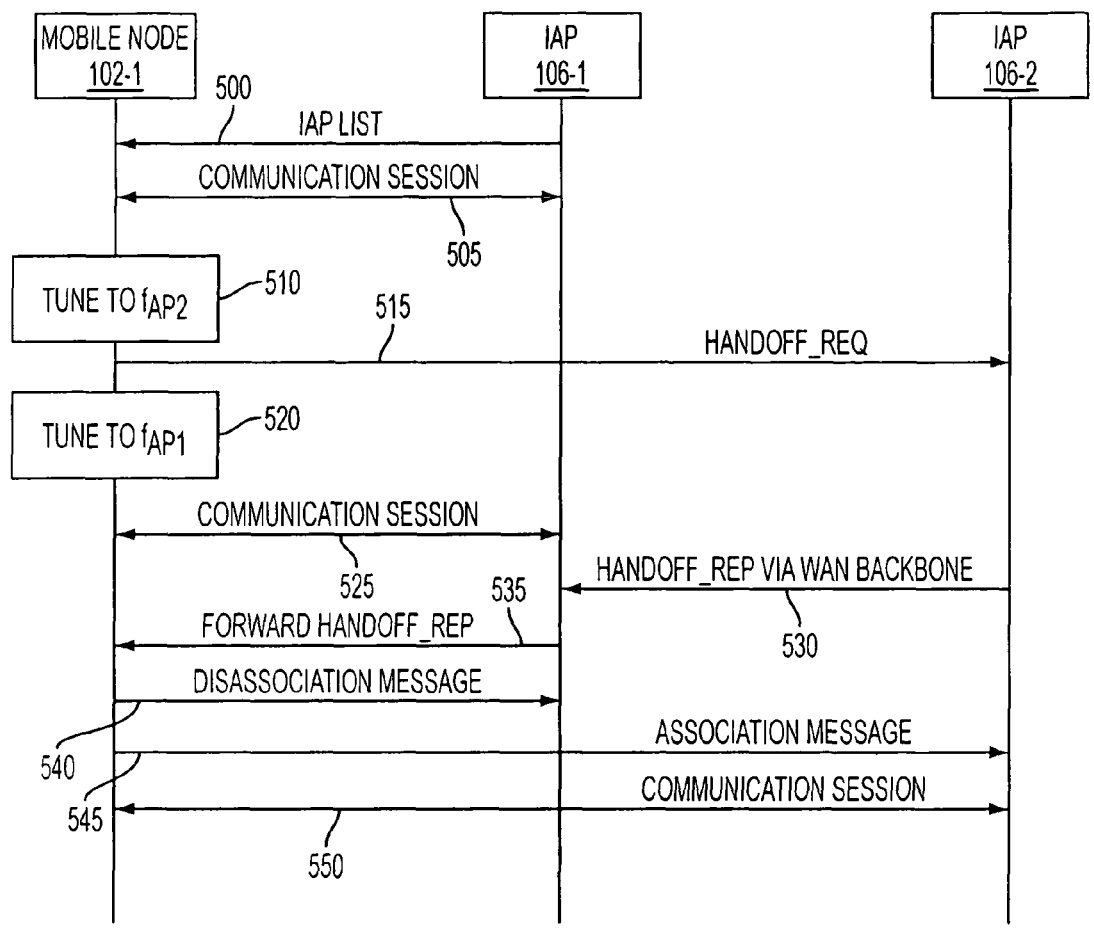
FIG. 5 is a message timing diagram illustrating an example of the flow of messages in the handoff process as shown in FIG. 4.

In the network 100 described above, the handoff process is started, for example, when the mobile node 102-1 determines that the routing metric associated with its current route to IAP 106-1 is falling below a threshold, or some other node (e.g., a mobile node 102 or fixed router 107) is providing metrics indicating a better route to an IAP 106-2 as described, for example, in a published U.S. Patent Application No. 2004/0143842 entitled "System and Method for Achieving Continuous Connectivity to an Access Point or Gateway in a Wireless Network Following an On-Demand Routing Protocol, and to Perform Smooth Handoff of Mobile Terminals Between Fixed Terminals in The Network" and in published U.S. Patent Application No. 2004/0246935 entitled, "System and Method for Characterizing the Quality of a Link Wireless Network", the entire content of both being incorporated herein by reference. In the case of inter-frequency handoff, the new route to the IAP 106-2 may be on a different frequency, and the mobile node 102-1 may not be able to learn the routing metrics to IAPs 106 operating on other frequencies and to compare those routing metrics to the routing metrics pertaining to the route to the IAP 106-1 with which mobile node 102-1 is currently associated. Therefore, according to an embodiment of the present invention, the IAPs 106 keep the nodes 102 in their neighborhood or broadcast range informed about the presence of neighboring IAPs 106 and their respective frequency channels. This can be done when the nodes 102 start communicating with their respective associated IAP 106 initially or on a periodic basis throughout the duration of the association of the node 102 and its IAP 106. This information, provided by the IAPs 106 to the mobile nodes 102 associated to them, can also include the most recent information about the QoS capabilities of the neighboring IAPs 106. When such information is delivered to the mobile nodes 102 periodically, the instantaneous QoS capability of the neighboring IAPs 106 can thus be monitored. In addition, the nodes 102 that receive this information from the IAPs 106 can further propagate this information to other nodes (e.g., nodes 102 or 107) in a multi-hopping manner as described above Accordingly, in the network 100 as shown in FIG. 1, when the mobile node 102-1 determines that it needs to handoff to another IAP (e.g., IAP 106-2), the controller 112 of the mobile node 102-1 can initiate and perform the handoff process as discussed below. That is, as discussed above, the controller 112 of the mobile node 102-1 can either make this determination when the routing metric to the IAP 106-1 with which mobile node 102-1 is currently associated falls below a certain threshold, or if the IAP 106-1 instructs the node 102-1 to handoff to another IAP (e.g., IAP 102-6) for load balancing or other reasons. An example of the handoff process is illustrated in the flowchart shown in FIG. 4 and the message timing diagram shown in FIG. 5.

In this example, the mobile node 102-1 is initially associated with IAP 106-1 and has a bi-directional communication link between itself and IAP 106-1. Over bi-directional communication link, mobile node 102-1 periodically receives from its current IAP 106-1 information pertaining to the list of neighboring IAPs 106, their operating frequency and offered QoS levels, for example, as indicated in step 400 in the flowchart of FIG. 4 and the IAP list message 500 in FIG. 5. During step 402, the mobile node 102-1 continues its communication session 505 (see FIG. 5).

In step 404, mobile node 102-1 determines whether it will handoff from IAP 106-1 to another IAP (e.g. IAP 106-2). If no handoff will occur at this time, the flow returns to step 400 where the mobile node 102-1 can receive another IAP message list and continue its communication session in step 402. However, if the mobile node 102-1 determines in step 404 that handoff is to occur for any of the reasons given above, the processing proceeds to step 406 where mobile node 102-1 selects one IAP (e.g., IAP 106-2) from the list provided by IAP 106-1. This decision is either random or based on, for example, the QoS levels provided in the list. That is, the mobile node 102-1 can pick the IAP which best meets its required QoS levels. In the example, IAP 106-2 is selected as the handoff target.

In step 408, mobile node 102-1 tunes to the frequency of IAP 106-2, $f_{AP2}$ (operation 510 in FIG. 5) and in step 410, sends a Handoff Request (HANDOFF_REQ) message 515 that can be received by IAP 106-2. The Handoff Request message may contain a combination of information including, but not limited to, the following fields:

a. Message Identifier: Handoff Request;
   b. Address of the mobile node 102-1;
   c. Address of the IAP 106-1 with which the Mobile node 102-1 is currently communicating and is associated;

d. Minimum QoS requirements; and e. Authentication information.

Upon completing the transmission of the HANDOFF-REQ, in step 412 the mobile node 102-1 tunes back to the frequency of IAP 1, $f_{AP1}$ (operation 520 in FIG. 6), and in step 414 continues participating in the current communication session 525. In step 416, the HANDOFF_REQ message is received by the IAP 106-2 and in step 418, the IAP 106-2 determines the metrics to the mobile node 102-1 based on reception of the message, and can also determine if it can meet the QoS requirements of the mobile node 102-1. The HANDOFF_REQ could also reach IAP 106-2 by traversing multiple hops of other devices 102 and/or 107 operating on frequency $f_{AP2}$.

If IAP 106-2 determines in step 420 that it can meet the QoS requirements, in step 424 IAP 106-2 sends a Handoff Reply (HANDOFF_REP) message 530 directed towards the mobile node 102-1 through the LAN or WAN backbone, for example, for receipt by the IAP 106-1. However, if IAP 106-2 cannot meet the minimum requirements, it can send a negative Handoff Reply in step 422 signifying its inability to provide the services. The Handoff Reply message 530 can also include information pertaining to the routing metrics to the IAP 106-2, and this information can be used by the mobile node 102-1 to select the best IAP 106 for the handoff, if mobile node 102-1 is considering multiple IAPs 106 as possible candidates for handoff.

In step 426, IAP 106-1 forwards the Handoff Reply message as forwarded Handoff Reply message 535 (see FIG. 5) to mobile node 102-1. In step 428, the mobile node 102-1, upon receiving the HANDOFF_REP message, determines whether the routing metrics to IAP 106-2 meet the desired routing criteria and/or QoS criteria. If the routing metrics and/or the available QoS levels do not meet the desired criteria, the above process can repeated again for the same IAP 106-2 or another IAP 106.

If the routing metrics meet the desired routing metrics criteria and/or QoS criteria, the mobile node 102-1 can decide in step 430 whether to select IAP 106-2 and thus tune its frequency to that of IAP 106-2. The processing can then determine in step 432 whether to repeat the above process for other IAPs 106 to compare the metrics or QoS reported by them. If the process is not repeated in its entirety, for example, the processing can determine in step 434 whether to repeat a portion of the process beginning, for example, in step 408, so that mobile 102-1 can send a few more Handoff Request messages to the same IAP 106-2 and can receive additional Handoff Reply messages to be able to better estimate the metrics of the IAP 106-2.

If the processing ultimately determines in steps 432 and 434 not to repeat the above process any further, the mobile node 102-1 can then select to associate with the new IAP 106-2 by sending in step 436 a disassociation message 540 (see FIG. 5) to IAP 106-1. In step 438, the node 102-1 tunes to the frequency of IAP 106-2 and in step 440, sends an association message 545 to IAP 106-2. In step 442, the mobile node 102-1 resumes the communication session 550 using IAP 106-2 using the frequency of IAP 106-2, and the handoff process is completed.

The embodiments of the present invention described herein can also perform several variations to the above process, which are described below.

For example, if the IAPs 106 are using some combination of contention period and contention-free period as part of media access control (MAC) design (for example, a MAC design in accordance with IEEE Standard 802.11e), the current IAP 106-1 can inform the mobile node 102-1 about the contention periods of other IAPs 106, so that the mobile node 102-1 does not interfere with any other node 102 or fixed router 107 while initiating the handoff process, and the HANDOFF_REQ thus has a higher possibility of error-free reception. If the IAPs 106 are using a time slot assignment scheme as a part of MAC algorithm, additional steps might be performed in further reducing the loss of packets. In this case, the current IAP 106-1 should determine information about the QoS and time slot availability at the neighboring IAPs 106 and select the best candidate for handoff. The current IAP 106-1 can then reserve a slot with the selected IAP (e.g., IAP 106-2) to which the mobile node 102-1 can transmit the Handoff Request message, and then inform the mobile node 102-1 about the selected IAP 106-2, the frequency the IAP 102-6 is currently using, and the reserved time slot. This process can be repeated for all suitable neighbor IAPs 106, so that the mobile node 102-1 can compare the different routing metrics available and select the best handoff candidate.

It is also possible in a multihop wireless network 100 that the Handoff Request message is received by a device other than the selected IAP 106. For example, if there are many nodes 102 and fixed router 107 present in the service areas of the neighboring IAPs 106, there is a high likelihood that one node 102 or fixed router 107 will not be busy transmitting/receiving and will successfully receive this message. A particular device (e.g., node 102 or fixed router 107) may have the responsibility to inform its corresponding IAP (e.g., 106-2) of this message, and that IAP 106-2 will collect the cumulative routing metrics between itself and the mobile node 102-1 and inform the mobile node 102-1 via, for example, the WAN 104. Thus, in the process described earlier, the Handoff Request message may not be directly heard by IAP 106-2, and may actually reach IAP 106-2 after multi-hopping through some other nodes 102 and/or fixed router 107 in the network that are tuned to the same frequency as IAP 106-2.

Also, in place of the mobile node 102-1 sending the Handoff Request message to the selected IAP 106-2, the current IAP 106-1 can request its neighboring IAPs 106 to facilitate the handoff. For example, the current IAP 106-1 can request other IAPs 106 to retune their frequency to that of the current IAP 106-1 and listen for the particular mobile node 102-1. In this event, the mobile node 102-1 should send some message at periodic intervals. For example, if the mobile node 102-1 is not actively sending data, the mobile node 102-1 can send some hello messages. The neighboring IAPs 106 can retune when this retuning will not disrupt their own existing traffic. In a multihop scenario, the IAPs 106 can direct all, or a subset of the nodes 102 and/or fixed routers 107 associated with them, listen for the particular mobile node 102-1 at the particular frequency. This technique can be useful if there is a high priority mobile node 102-1 moving across IAPs 106 with little or no traffic.

Finally, it is possible that the inter-frequency handoff is executed without any node (mobile node 102-1 or IAP 106-2) changing the frequency. This is possible if the mobile node 102-1 sends the Handoff Request message directly to the currently associated IAP 106-1 after determining a need of handoff, and the IAP 106-1 relays this message to an appropriate IAP, for example, IAP 106-2. The Reply message coming from the IAP 106-2 is relayed in the same manner as described earlier with regard to FIGS. 4 and 5. It should also be noted that this technique is suitable when the handoff is not based on the metrics, since the need for handoff is determined when the measurements (e.g., QoS) are taken on the same frequency on which subsequent data packets will be transmitted.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for changing association of a mobile node in a wireless communication network from a first access point to a second access point, the method comprising:
   within the mobile node:
      communicating at a first frequency with the first access point with which the mobile node is associated;
      determining that it is to associate with the second access point;
      initiating a handoff process in response to determining the association of the mobile node with the second access point by sending a request message including a quality of service requirement at a second frequency at which the second access point communicates for receipt by the second access point; and
      changing its communication frequency back to the first frequency after sending the request message, thereby continuing communication with the first access point;
   within the second access point:
      receiving the request message including the quality of service requirement;
      determining if it can meet the quality of service requirement; and
      sending a reply message indicating if the second access point can meet the quality of service requirement to the mobile node via the first access point; and
   within the mobile node:
      receiving the reply message sent by the second access point in response to the request message, wherein the reply message includes a performance characteristic of the second access point, wherein the performance characteristic relates to a quality of service desired by the mobile node; and
      when the performance characteristic meets a desired criteria, operating the mobile node to change its frequency to the second frequency and become associated with the second access point.

2. A method as claimed in claim 1, wherein:
   the first access point and the second access point communicate within a communication medium, and wherein the communication medium is selected from a group comprising a local area network and a wide area network.

3. A method as claimed in claim 1, further comprising:
   within the first access point:
      forwarding the reply message to the mobile node at the first frequency.

4. A method as claimed in claim 1, further comprising:
   within the mobile node:
      receiving the reply message from the second access point via the first access point, wherein the reply message includes one or more information; and
      determining an identity of the second access point based on the information.

5. A method as claimed in claim 1, wherein the request message is sent from the mobile node to the second access point via at least one other node.

6. A method as claimed in claim 1, further comprising:
   within operating the mobile node:
      reviewing characteristics of other access points to select the second access point, by performing the following steps for each of the other access points:
         changing its communication frequency to a frequency at which the other access point communicates, and sending another request message at the frequency at which the other access point communicates for receipt by the other access point; and
         changing its communication frequency back to the first frequency after sending the another request message and before sending any additional message; and
      selecting one of the other access points as the second access point based on one or more respective reply messages received from the respective other access points including respective information pertaining to the respective other access points.

7. A method for changing association of a mobile node in a wireless communication network from a first access point to a second access point, the method comprising:
   within the mobile node:
      communicating at a first frequency with the first access point with which the mobile node is associated;
      periodically receiving one or more information associated with a list of neighboring access points from the first access point, wherein the one or more information includes one or more information selected from a group of information comprising an identity, an operating frequency and a quality of service level;
      determining to handoff from the first access point to another access point;
      selecting the second access point from the list of neighboring access points;
      initiating a handoff process in response to selecting the second access point by sending a request message at a second frequency at which the second access point communicates for receipt by the second access point; and
      changing its communication frequency back to the first frequency after sending the request message, thereby continuing communication with the first access point; and
   within the second access point:
      receiving the request message, wherein the request message includes a communication requirement; and
      sending a reply message indicating if the second access point can meet the communication requirement to the mobile node via the first access point.

8. A method as claimed in claim 7, wherein the one or more information associated with a list of neighboring access points comprises a quality of service level associated with each of the neighboring access points, and further wherein the selecting step comprises selecting the second access point based on the quality of service level.

9. A method for changing association of a mobile node in a wireless communication network from a first access point to a second access point, the method comprising:

within the mobile node:

communicating at a first frequency with the first access point with which the mobile node is associated;

determining to handoff from the first access point to another access point;

receiving contention period from the first access point, the contention period corresponding to a plurality of access points;

within the first access point:

determining quality of service provided and time slot availability based upon a MAC algorithm from the plurality of access points; and selecting the second access point from the plurality of access points for the mobile node to transmit a hand-off request message to the second access point; and within the second access point:

receiving a handoff request message from the mobile node, wherein the handoff request message includes a communication requirement; and sending a reply message indicating if the second access point can meet the communication requirement to the mobile node via the first access point.

* * * * *

UNITED STATES PATENT AND TRADEMARK OFFICE
CERTIFICATE OF CORRECTION

| | | |
|---|---|---|
| PATENT NO. | : 7,929,968 B2 | |
| APPLICATION NO. | : 11/251674 | |
| DATED | : April 19, 2011 | |
| INVENTOR(S) | : Joshi et al. | |

It is certified that error appears in the above-identified patent and that said Letters Patent is hereby corrected as shown below:

On the Title Page, item (75), under "Inventors", in Column 1, Line 2, delete "Shyamai" and insert -- Shyamal --, therefor.

Signed and Sealed this
First Day of January, 2013

David J. Kappos
*Director of the United States Patent and Trademark Office*